(12) United States Patent
Hecht

(10) Patent No.: US 12,172,219 B2
(45) Date of Patent: Dec. 24, 2024

(54) CUTTING INSERT HAVING GROOVED TOP AND BOTTOM ABUTMENT SURFACES WITH INNER AND OUTER PAIRS OF WEDGE ANGLES, AND CUTTING TOOL

(71) Applicant: ISCAR, LTD., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 443 days.

(21) Appl. No.: 17/696,189

(22) Filed: Mar. 16, 2022

(65) Prior Publication Data

US 2023/0294176 A1 Sep. 21, 2023

(51) Int. Cl.
*B23B 27/08* (2006.01)
*B23B 27/18* (2006.01)
*B23B 29/04* (2006.01)
*B23B 27/04* (2006.01)

(52) U.S. Cl.
CPC ........... *B23B 27/086* (2013.01); *B23B 27/18* (2013.01); *B23B 27/04* (2013.01); *B23B 29/043* (2013.01); *B23B 2205/02* (2013.01)

(58) Field of Classification Search
CPC ... B23B 27/04; B23B 29/043; B23B 2205/02; B23B 27/086; B23B 27/18; B23B 2200/088; B23B 2200/165; B23B 2205/125
See application file for complete search history.

(56) References Cited

U.S. PATENT DOCUMENTS

| | | | |
|---|---|---|---|
| 3,760,474 A | 9/1973 | Stein | |
| 5,150,992 A * | 9/1992 | Friedmann | B23B 27/045 |
| | | | 407/117 |
| 5,161,920 A * | 11/1992 | Zinner | B23B 27/045 |
| | | | D15/139 |
| 5,676,495 A | 10/1997 | Katbi et al. | |
| 5,829,924 A * | 11/1998 | Oshnock | B23B 27/045 |
| | | | 407/117 |
| 5,836,723 A * | 11/1998 | Von Haas | B23B 27/04 |
| | | | 407/107 |
| 5,934,843 A | 8/1999 | Brask et al. | |

(Continued)

FOREIGN PATENT DOCUMENTS

| | | | |
|---|---|---|---|
| EP | 3 421 159 | 1/2019 | |
| JP | 2017052024 A * | 3/2017 | ............. B23B 27/04 |

OTHER PUBLICATIONS

International Search Report dated Jun. 16, 2023, issued in PCT counterpart application No. PCT/IL2023/050180.

(Continued)

*Primary Examiner* — Sara Addisu
(74) *Attorney, Agent, or Firm* — Womble Bond Dickinson (US) LLP

(57) ABSTRACT

A cutting tool used for turning operations is releasably secured to a tool holder. The cutting insert includes top and bottom insert surfaces, each surface including two pairs of insert wedge surfaces. The tool holder includes an insert pocket having a pocket top surface and a pocket bottom surface. When the cutting tool is assembled, only one of the two pairs of insert wedge surfaces of the insert top surface engages the pocket top surface, and only one of the two pairs of insert wedge surfaces of the insert bottom surface engage the pocket bottom surface.

25 Claims, 6 Drawing Sheets

(56) References Cited

U.S. PATENT DOCUMENTS

| | | | |
|---|---|---|---|
| 6,086,291 | A | 7/2000 | Hansson et al. |
| 6,261,032 | B1 | 7/2001 | Duwe et al. |
| 6,428,247 | B1 | 8/2002 | Friedman |
| 7,866,924 | B2 * | 1/2011 | Nagaya ................ B23B 29/043 407/102 |
| 9,242,300 | B2 | 1/2016 | Kaufmann et al. |
| 2008/0240874 | A1 | 10/2008 | Nagaya et al. |
| 2009/0285645 | A1 | 11/2009 | Hecht |
| 2010/0119314 | A1 | 5/2010 | Nagaya et al. |
| 2012/0082519 | A1 | 4/2012 | Hecht |
| 2015/0003921 | A1 | 1/2015 | Andersson et al. |
| 2020/0206823 | A1 | 7/2020 | Kotarac |

OTHER PUBLICATIONS

Written Opinion dated Jun. 16, 2023, issued in PCT counterpart application No. PCT/IL2023/050180.

* cited by examiner

CUTTING INSERT HAVING GROOVED TOP AND BOTTOM ABUTMENT SURFACES WITH INNER AND OUTER PAIRS OF WEDGE ANGLES, AND CUTTING TOOL

FIELD OF THE INVENTION

The subject matter of the present application relates to cutting tools. Specifically, to metal cutting tools for turning operations. More specifically, to wedged engagements between a cutting insert and a holder of a cutting tool.

BACKGROUND OF THE INVENTION

In the field of metal cutting, it is known to provide a wedged engagement between the cutting insert and holder with two wedge angles. Providing such a wedged engagement increases the stability of the cutting insert in the holder and is thus desirable.

However, the wedged engagement in U.S. Pat. No. 6,086,291 allows only for a single angle engagement between the cutting insert and the holder. At the same time, the wedged engagement in U.S. Pat. No. 7,866,924 allows for a wide range of angles with line contact between the surfaces of the cutting insert and the tool holder.

It is an object of the subject matter of the present application to provide a cutting tool with an improved wedged engagement between surfaces of the cutting insert and the tool holder that may allow two different tool holder angles which depend on the properties of the machining operation.

SUMMARY OF THE INVENTION

In accordance with a first aspect of the invention there is provided a cutting insert having an insert longitudinal axis, and comprising:
  a front insert surface and an opposing rear insert surface;
  a peripheral insert surface extending between the front insert surface and the rear insert surface and about the insert longitudinal axis, the peripheral insert surface comprising:
    a top insert surface and an opposing bottom insert surface;
    a first insert side surface connecting the top and bottom insert surfaces; and
    a second insert side surface opposing the first insert side surface and connecting the top and bottom insert surfaces;
  a longitudinal insert bisector plane which contains the insert longitudinal axis and passes midway between the first and second insert side surfaces;
  an insert lateral axis passing midway in-between the top and bottom insert surfaces, midway in-between the front and rear insert surfaces and through the first and second insert side surfaces;
  an insert vertical axis contained in the longitudinal insert bisector plane, passing midway in-between the first and second insert side surfaces and through the top and bottom insert surfaces; and
  a first cutting edge formed an intersection between the front insert surface and the top insert surface;
wherein:
  the top insert surface has an elongated top groove which comprises:
    an elongated outer pair of insert top wedge surfaces concavely converging in a direction from the first and second insert side surfaces towards each other, and defining an outer top angle Ot; and
    an elongated inner pair of insert top wedge surfaces located between the outer pair of insert top wedge surfaces, concavely converging in a direction from the outer pair of insert surfaces, and defining an inner top angle It;
  the bottom insert surface has an elongated bottom groove which comprises:
    an elongated outer pair of insert bottom wedge surfaces concavely converging in a direction from the first and second insert side surfaces and defining an outer bottom angle Ob; and
    an elongated inner pair of insert bottom wedge surfaces located between the outer pair of insert bottom wedge surfaces, concavely converging in a direction from the outer pair of insert bottom wedge surfaces, and defining an inner bottom angle Ib;
  the outer and inner top angles Ot, It fulfill the condition: $160°>Ot>It>100°$; and
  the outer and inner bottom angles Ob, Ib fulfill the condition: $160°>Ob>Ib>100°$.

In accordance with a second aspect of the invention, there is provided a cutting tool comprising:
  a cutting insert described above; and
  a tool holder comprising:
    a pair of opposing first and second holder side surfaces, with a holder front surface extending therebetween;
    an insert pocket opening out to the first holder side surface, the second holder side surface and the holder front surface, the insert pocket having a longitudinally extending pocket axis which passes midway between the opposing pocket top surface and the pocket bottom surface;
wherein:
  the cutting insert is releasably retained in the insert pocket.

In accordance with a third aspect of the invention there is provided a cutting tool comprising:
  a cutting insert having an insert longitudinal axis, and comprising:
    a front insert surface and an opposing rear insert surface;
    a peripheral insert surface extending between the front insert surface and the rear insert surface and about the insert longitudinal axis, the peripheral insert surface comprising:
      a top insert surface and an opposing bottom insert surface;
      a first insert side surface connecting the top and bottom insert surfaces; and
      a second insert side surface opposing the first insert side surface and connecting the top and bottom insert surfaces;
    a first cutting edge formed an intersection between the front insert surface and the top insert surface;
    the top insert surface having an elongated top groove which comprises:
      an elongated outer pair of insert top wedge surfaces, concavely converging in a direction from the first and second insert side surfaces towards each other, with an outer top angle Ot defined between the outer pair of insert top wedge surfaces; and
      an elongated inner pair of insert top wedge surfaces, located between the outer pair of insert top wedge surfaces and concavely converging in a direction from the outer pair of insert surfaces, with an inner top angle It defined between the inner pair of insert top wedge surfaces;

the bottom insert surface having an elongated bottom groove which comprises:

an elongated outer pair of insert bottom wedge surfaces, concavely converging in a direction from the first and second insert side surfaces, with an outer bottom angle Ob defined between the outer pair of insert bottom wedge surfaces; and an elongated inner pair of insert bottom wedge surfaces, located between the outer pair of insert bottom wedge surfaces and concavely converging in a direction from the outer pair of insert bottom wedge surfaces, with an inner bottom angle Ib defined between the inner pair of insert bottom wedge surfaces;

and a tool holder comprising:

a pair of opposing first and second holder side surfaces, with a holder front surface extending therebetween;

an insert pocket accommodating the cutting insert and opening out to the first holder side surface, the second holder side surface and the holder front surface, the insert pocket comprising:

a pocket top surface and an opposing pocket bottom surface, with a pocket rear surface located therebetween;

the pocket top surface comprising an elongated pair of pocket top wedge surfaces, convexly converging from the first and second holder side surfaces with a top pocket angle Pt defined between the pair of pocket top wedge surfaces; and the pocket bottom surface comprising an elongated pair of pocket bottom wedge surfaces, convexly converging from the first and second holder side surfaces, with a bottom pocket angle Pb defined between the pair of pocket bottom wedge surfaces;

wherein:

the cutting insert is releasably retained in the tool holder;

one pair of the outer and inner pair of insert top wedge surfaces abuts the pair of pocket top wedge surfaces; and one pair of the outer and inner pair of insert bottom wedge surfaces abuts the pair of pocket bottom wedge surfaces, such that, in a cross-section of the cutting tool taken in a plane passing through the top and bottom insert surfaces and generally parallel to the front insert surface, at both the top and bottom insert surfaces, there are only two regions of contact between the cutting insert and the insert pocket.

It is understood that the above-said is a summary, and that features described hereinafter may be applicable in any combination to the subject matter of the present application, for example, any of the following features may be applicable to the cutting insert and/or the cutting tool.

Each surface of the outer and inner pairs of insert top wedge surfaces may be planar. Each surface of the outer and inner pairs of insert bottom wedge surfaces may be planar.

The outer top and bottom angles Ot, Ob may fulfill the condition: Ot=Ob. The inner top and bottom angles It, Ib may fulfill the condition: It=Ib.

The outer top and bottom angles Ot, Ob may fulfill the condition: $130°<Ot, Ob<160°$. The inner top and bottom angles It, Ib may fulfill the condition: $100°<It, Ib<130°$.

The outer and inner top angles Ot, It may fulfill the condition: $It<Ot<It+30°$. The outer and inner bottom angles Ob, Ib may fulfill the condition: $Ib<Ob<Ib+30°$.

The cutting insert may be double-ended and further comprise a second cutting edge formed at an intersection between the rear insert surface and either the top insert surface or the bottom insert surface.

The second cutting edge may be formed at an intersection between the rear insert surface and the top insert surface. The cutting insert may have 180° rotational symmetry about the insert vertical axis.

The second cutting edge may be formed at an intersection between the rear insert surface and the bottom insert surface. The cutting insert has 180° rotational symmetry about the insert lateral axis.

The insert pocket may comprise: a pocket top surface and an opposing pocket bottom surface, with a pocket rear surface located therebetween. The pocket top surface may comprise an elongated pair of pocket top wedge surfaces, convexly converging from the first and second holder side surfaces with a top pocket angle Pt defined between the pair of pocket top wedge surfaces. The pocket bottom surface may comprise an elongated pair of pocket bottom wedge surfaces, convexly converging from the first and second holder side surfaces, with a bottom pocket angle Pb defined between the pair of pocket bottom wedge surfaces. The cutting insert may be retained in the insert pocket with either: the pair of pocket top wedge surfaces abutting the outer pair of insert top wedge surfaces and the pair of pocket bottom wedge surfaces abutting the outer pair of insert bottom wedge surfaces, or the pair of pocket top wedge surfaces abutting the inner pair of insert top wedge surfaces and the pair of pocket bottom wedge surfaces abutting the inner pair of insert bottom wedge surfaces, such that in a cross-section of the cutting tool taken in a plane passing through the top and bottom insert surfaces and generally parallel to the front insert surface, at both the top and bottom insert surfaces, there are only two regions of contact between the cutting insert and the insert pocket, respectively.

The top and bottom pocket angles Pt, Pb may fulfill the condition: $100°<Pt, Pb<160°$. The top pocket angle Pt may fulfill the condition Pt≤Ot. The bottom pocket angle Pb may fulfill the condition Pb≤Ob.

The top pocket angle Pt may fulfill the condition Pt≤It. The bottom pocket angle Pb may fulfill the condition Pb≤Ib.

The top and bottom pocket angles Pt, Pb may fulfill the condition: $130°<Pt, Pb<160°$, the outer pair of insert top wedge surfaces may abut the pair of pocket top wedge surfaces and the outer pair of insert bottom wedge surfaces may abut the pair of pocket bottom wedge surfaces.

The top and bottom pocket angles Pt, Pb may fulfill the condition: $100°<Pt, Pb<130°$, the inner pair of insert top wedge surfaces may abut the pair of pocket top wedge surfaces and the inner pair of insert bottom wedge surfaces may abut the pair of pocket bottom wedge surfaces.

Each surface of the outer and inner pairs of insert top wedge surfaces may be planar. Each surface of the outer and inner pairs of insert bottom wedge surfaces may be planar.

The outer and inner top angles Ot, It may fulfill the condition: Ot>It. The outer and inner bottom angles Ob, Ib may fulfill the condition: Ob>Ib.

The outer top and bottom angles Ot, Ob may fulfill the condition: Ot=Ob. The inner top and bottom angles It, Ib may fulfill the condition: It=Ib.

The outer top and bottom angles Ot, Ob may fulfill the condition: $130°<Ot, Ob<160°$. The inner top and bottom angles It, Ib may fulfill the condition: $100°<It, Ib<130°$.

The top and bottom pocket angles Pt, Pb may fulfill the condition: 100°<Pt, Pb<160°.

The top pocket angle Pt may fulfill the condition Pt≤Ot and the bottom pocket angle Pb may fulfill the condition Pb≤Ob.

The top and bottom pocket angles Pt, Pb may fulfill the condition: 130°<Pt, Pb<160°. The outer pair of insert top wedge surfaces may abut the pair of pocket top wedge surfaces. The outer pair of insert bottom wedge surfaces may abut the pair of pocket bottom wedge surfaces.

The top pocket angle Pt may fulfill the condition Pt≤It and the bottom pocket angle Pb may fulfill the condition Pb≤Ib.

The top and bottom pocket angles Pt, Pb may fulfill the condition: 100°<Pt, Pb<130°. The inner pair of insert top wedge surfaces may abut the pair of pocket top wedge surfaces. The inner pair of insert bottom wedge surfaces may abut the pair of pocket bottom wedge surfaces.

The cutting insert may be resiliently clamped in the insert pocket of the tool holder.

BRIEF DESCRIPTION OF THE FIGURES

For a better understanding of the present application and to show how the same may be carried out in practice, reference will now be made to the accompanying drawings, in which:

FIG. 6c is a cross section view of the cutting tool shown in FIG. 1 along line A-A in FIG. 6a;

FIG. 7a is a front view of the cutting tool shown in FIG. 3; and

FIG. 7b is a front view of another cutting tool in accordance with the present invention having a different tool holder and the same cutting insert as the cutting insert seen in FIGS. 3 & 7a.

Figure 1:
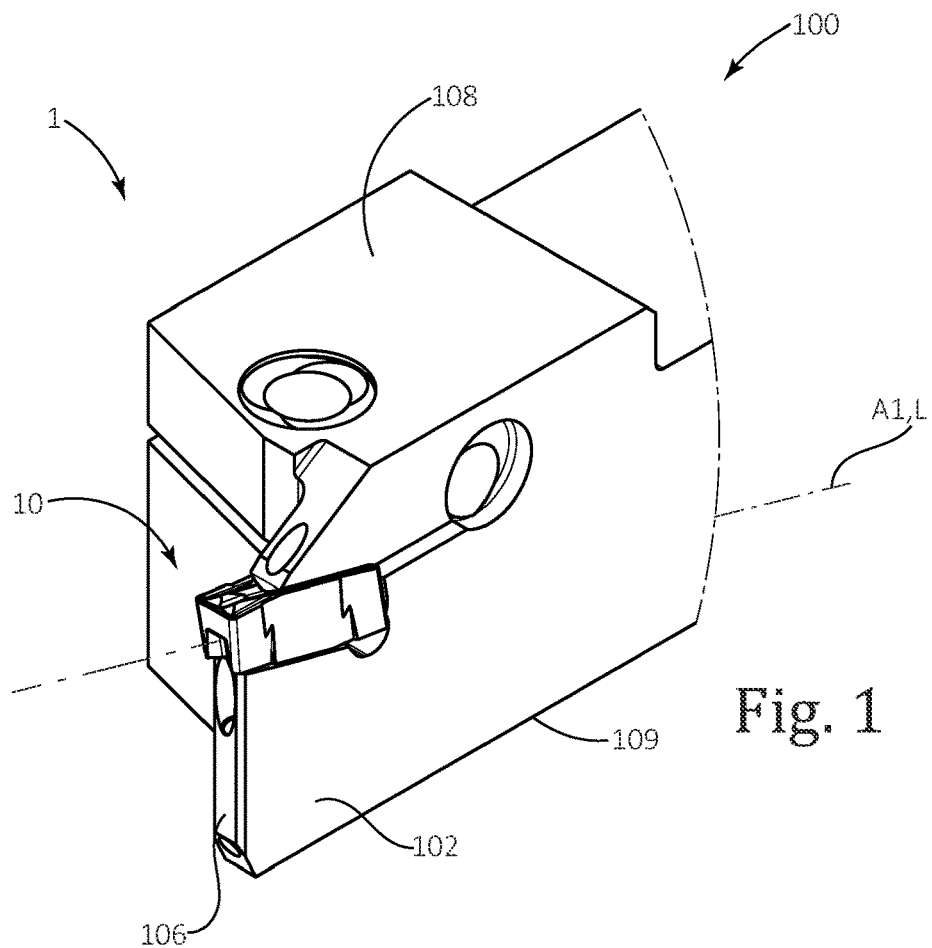
FIG. 1 is a perspective view of a cutting tool in accordance with the present invention.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 2:
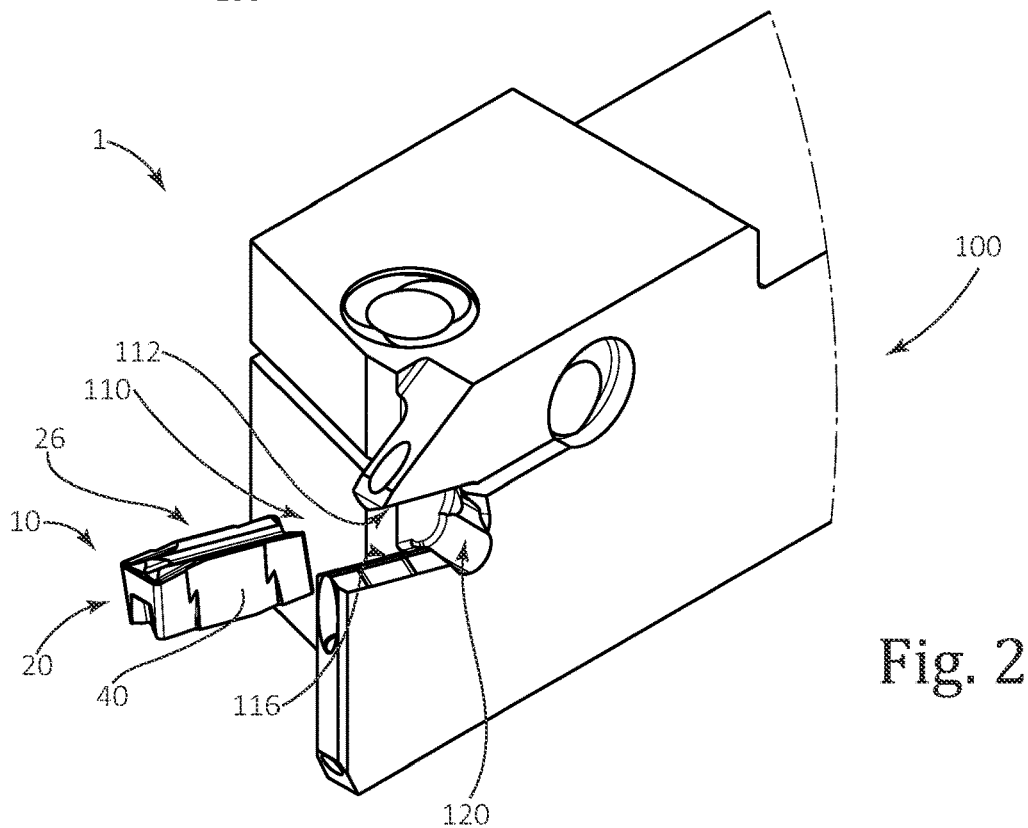
FIG. 2 is an exploded view of the cutting tool shown in FIG. 1.
Figure 3:
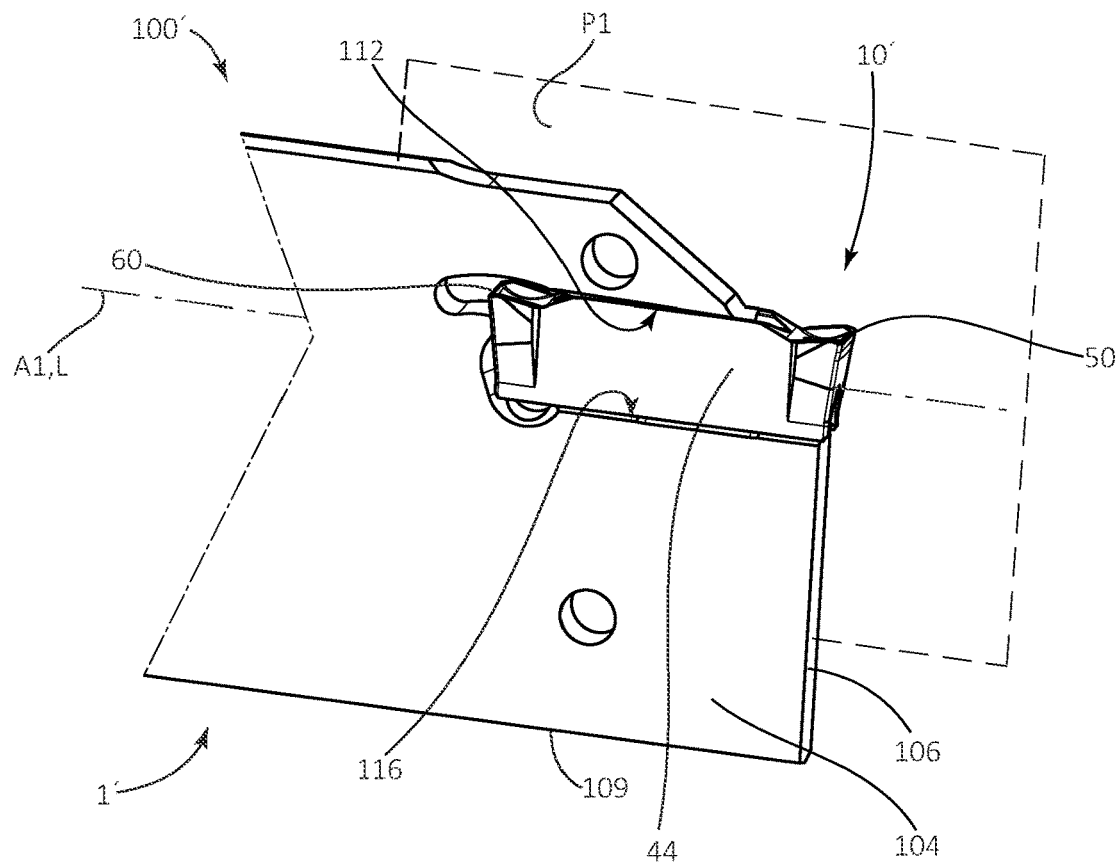
FIG. 3 is a perspective view of another cutting tool in accordance with the present invention having a different tool holder and a different cutting insert from the cutting tool seen in FIGS. 1 & 2.
Figure 4A:
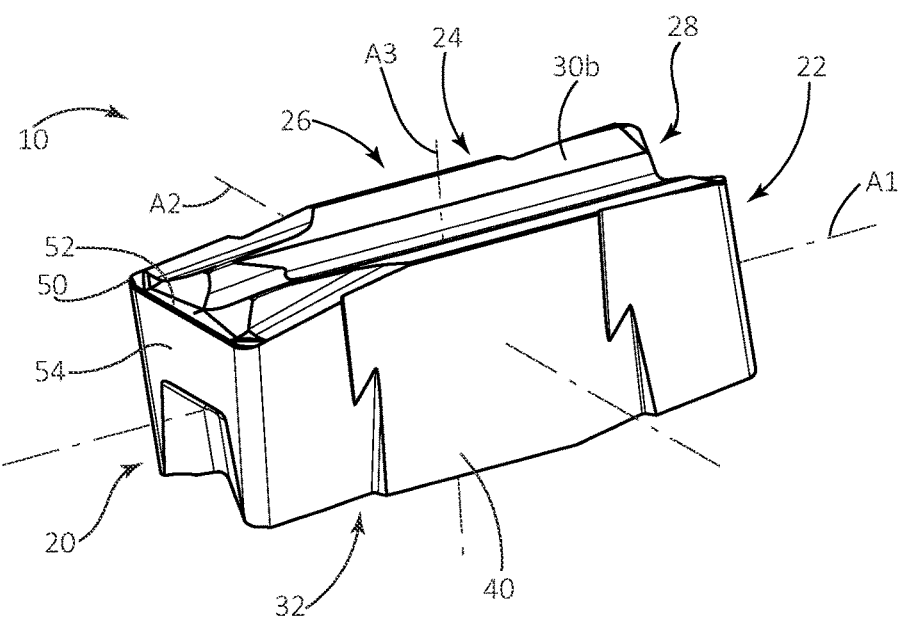
FIG. 4a is a perspective view of the cutting insert shown in FIG. 1.
Figure 4C:
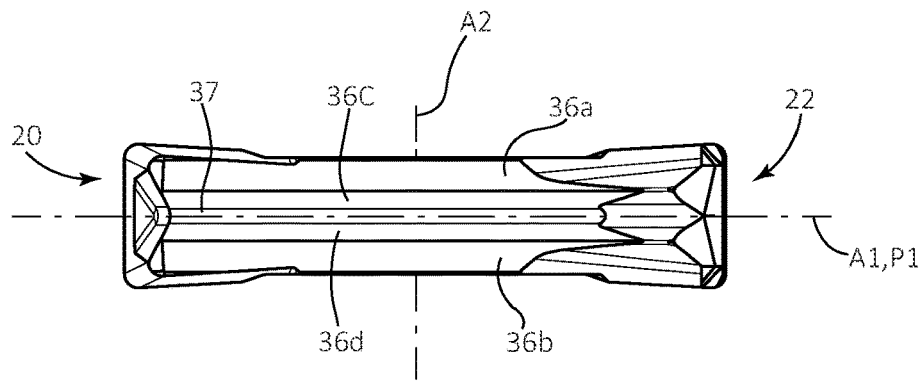
FIG. 4c is a bottom view of the cutting insert shown in FIG. 1.
Figure 4E:
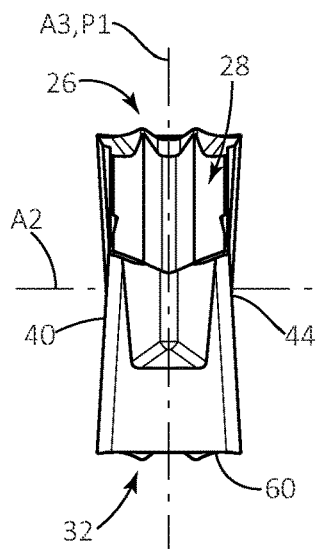
FIG. 4e is a rear view of the cutting insert shown in FIG. 1.
Figure 4D:
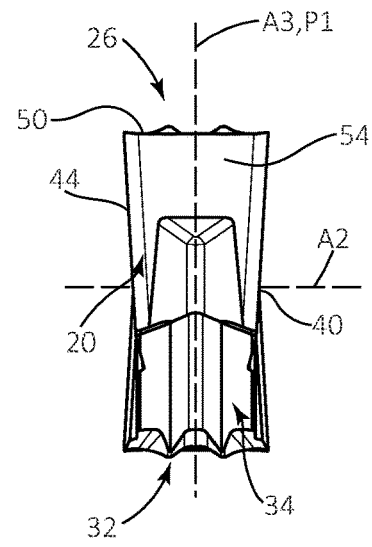
FIG. 4d is a front view of the cutting insert shown in FIG. 1.
Figure 4B:
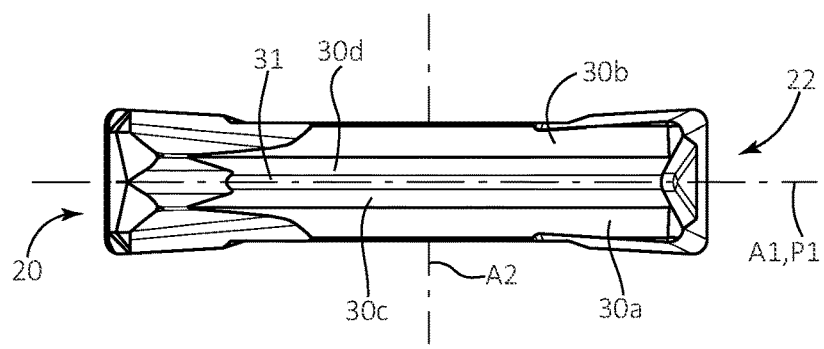
FIG. 4b is a top view of the cutting insert shown in FIG. 1.
Figure 5A:
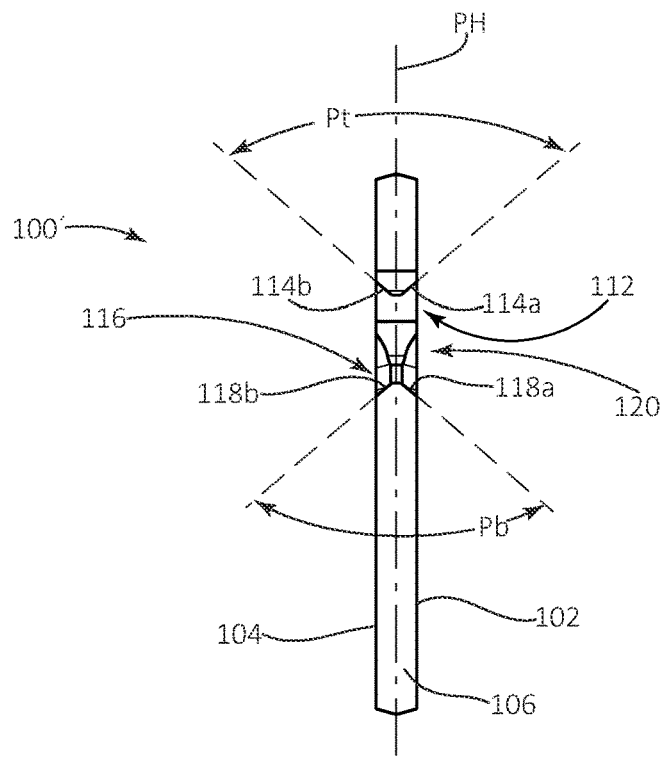
FIG. 5a is a front view of the tool holder shown in FIG. 3.
Figure 5B:
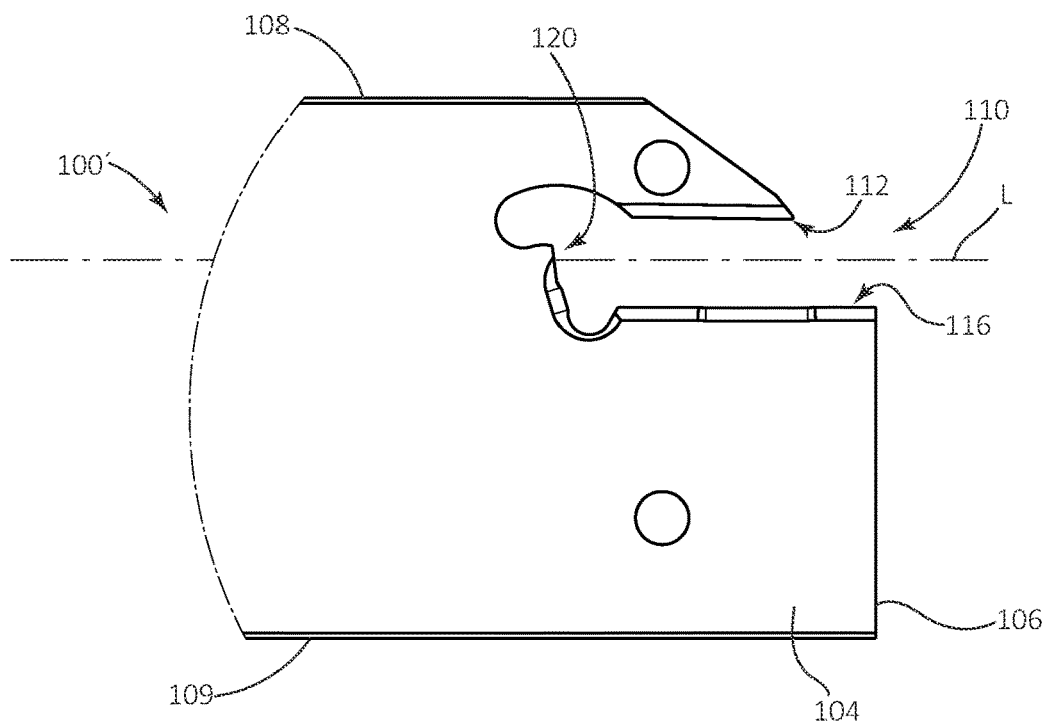
FIG. 5b is a side view of the tool holder shown in FIG. 3.

Attention is first drawn to FIGS. 1 to 3, where a cutting tool 1, 1' is shown. The cutting tool 1, 1' includes a cutting insert 10, 10' having an insert longitudinal axis A1 and a tool holder 100, 100'. When the cutting tool 1, 1' is assembled, the cutting insert 10, 10' is releasably clamped in the tool holder 100, 100'. In accordance with some embodiments, the cutting insert 10 may be releasably clamped in the tool holder 100 using fastening elements, such as screws (not shown). In accordance with some embodiments, the cutting insert 10' may be resiliently clamped in the tool holder 100'.

As shown in FIGS. 4a to 4e, the cutting insert 10 includes a front insert surface 20 and an opposing rear insert surface 22, with a peripheral insert surface 24 extending therebetween. The peripheral insert surface 24 also extends about the insert longitudinal axis A1.

The peripheral insert surface 24 includes a top insert surface 26 and an opposing bottom insert surface 32. The peripheral insert surface 24 further includes a first insert side surface 40 and an opposing second insert side surface 44 connecting the top and bottom insert surfaces 26, 32.

In some embodiments, the insert longitudinal axis A1 may pass midway in-between the top and bottom insert surfaces 26, 32, midway in-between the first and second insert side surfaces 40, 44, and through the front and rear insert surfaces 20, 22.

The cutting insert 10 also has an insert lateral axis A2 which may pass midway in-between the top and bottom insert surfaces 26, 32, midway in-between the front and rear insert surfaces 20, 22, and through the first and second insert side surfaces 40, 44. Also, in some embodiments, the insert lateral axis A2 may be perpendicular to the insert longitudinal axis A1. Furthermore, in some embodiments, the cutting insert 10 may have 180° rotational symmetry about the insert lateral axis A2.

The cutting insert 10, 10' has a longitudinal insert bisector plane P1 which contains the insert longitudinal axis A1 and passes midway between the first and second insert side surfaces 40, 44. The longitudinal insert bisector plane P1 may be perpendicular to the insert lateral axis A2, and passes through both the top and bottom insert surfaces 26, 32, and the front and rear insert surfaces 20, 22.

The cutting insert 10 may further have an insert vertical axis A3 contained in the longitudinal insert bisector plane P1 and passing through the top and bottom insert surfaces 26, 32. In some embodiments, the insert vertical axis A3 may be perpendicular to the insert longitudinal axis A1 and/or the insert lateral axis A2. Also, in some embodiments, the cutting insert 10' may have 180° rotational symmetry about the insert vertical axis A3.

The top insert surface 26 has an elongated top groove 28 comprising two pairs of elongated wedge surfaces. These include an outer pair of insert top wedge surfaces 30a, 30b and an inner pair of insert top wedge surfaces 30c, 30d. Here, the terms "inner" and "outer" are used with respect to the longitudinal insert bisector plane P1, with the "inner" surfaces being closer to the longitudinal insert bisector plane P1 and the "outer" surface being farther from the longitudinal insert bisector plane P1.

In the outer pair of insert top wedge surfaces 30a, 30b, each surface extends lengthwise in a direction between the front insert surface 20 and the rear insert surface 22 along one of the first and second insert side surfaces 40, 44. In other words, each surface of the outer pair of insert top wedge surfaces 30a, 30b is elongated. Each surface of the outer pair of insert top wedge surfaces 30a, 30b is located between the first and second insert side surfaces 40, 44 and concavely converges toward the other surface of the pair in the direction of the longitudinal insert bisector plane P1.

In accordance with some embodiments, one of the surfaces of the outer pair of insert top wedge surfaces 30a, 30b may be located on one side of the longitudinal insert bisector plane P1 and the other surface of the outer pair of insert top wedge surfaces 30a, 30b may be located on the other side of the longitudinal insert bisector plane P1.

In accordance with some embodiments, each surface of the outer pair of insert top wedge surfaces 30a, 30b may exhibit mirror symmetry with regards to the other surface. Specifically, the outer pair of insert top wedge surfaces 30a, 30b may exhibit mirror symmetry about the longitudinal insert bisector plane P1.

In some embodiments, each surface of the outer pair of insert top wedge surfaces 30a, 30b may be planar.

Figure 6A:
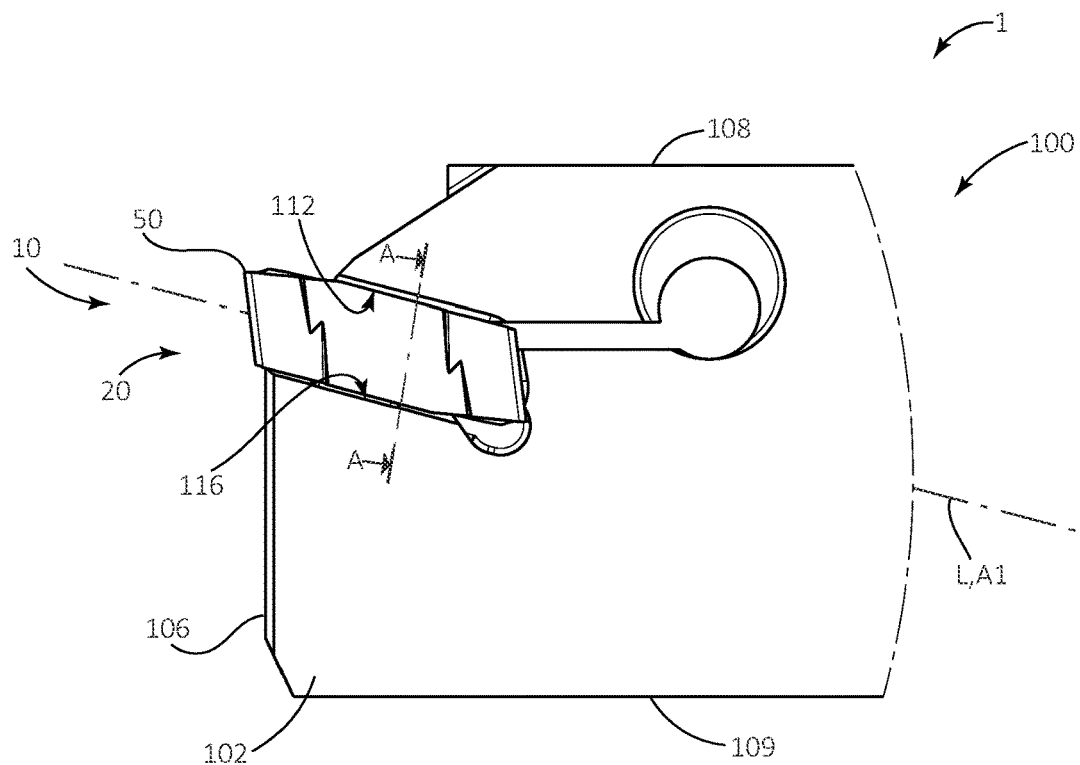
FIG. 6a is a side view of the cutting tool shown in FIG. 1.
Figure 6B:
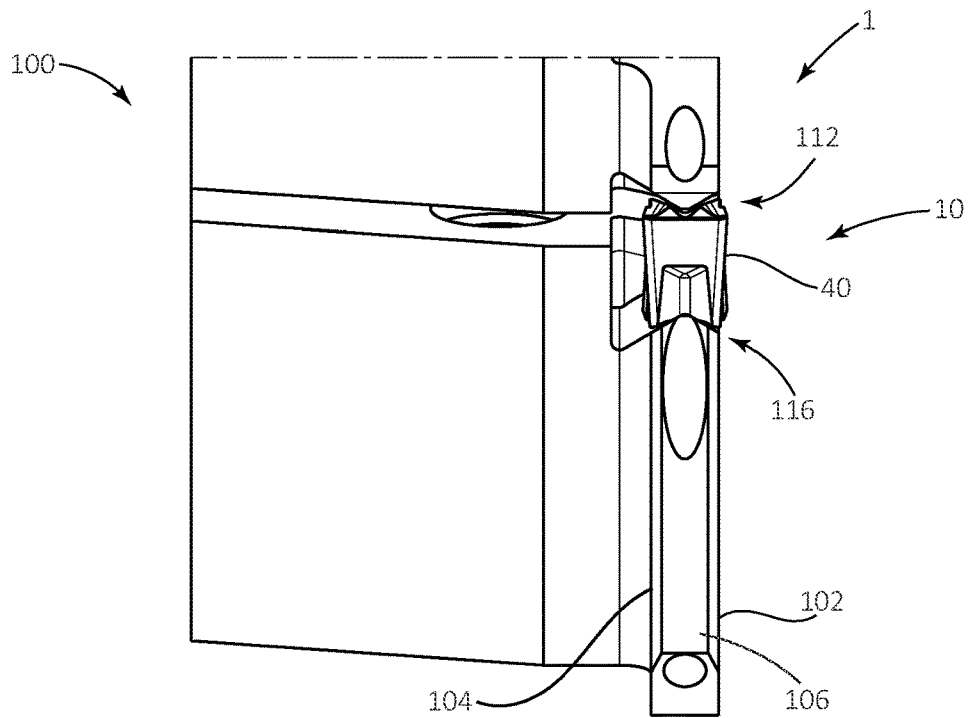
FIG. 6b is a front view of the cutting tool shown in FIG. 1.
Figure 6C:
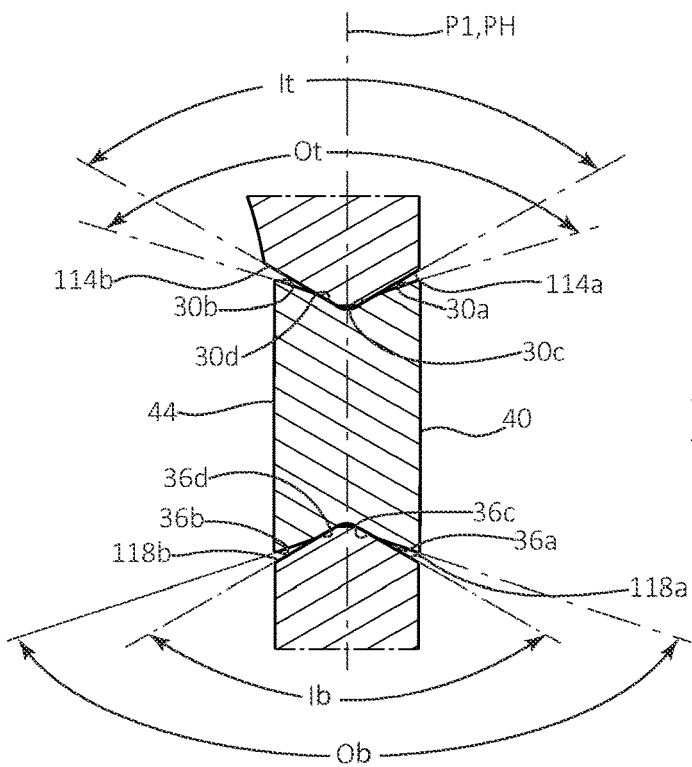

Drawing attention to FIGS. 6a to 6c, an outer top angle Ot is defined between the outer pair of insert top wedge surfaces 30a, 30b. Specifically, the outer top angle Ot is defined in a plane perpendicular to the insert longitudinal axis A1 (indicated as line A-A in FIG. 6a). In accordance with some embodiments, the outer top angle Ot may fulfill the condition: $130°<Ot<160°$. Preferably, the outer top angle Ot may fulfill the condition: $135°<Ot<150°$. More preferably, the outer top angle Ot may be about $Ot=140°$. By "about" it is meant that the outer top angle Ot is within 2° of 140°.

In the inner pair of insert top wedge surfaces 30c, 30d, each surface extends lengthwise in a direction between the front insert surface 20 and the rear insert surface 22 along one of the outer pair of insert top wedge surfaces 30a, 30b. That is to say, each surface of the inner pair of insert top wedge surfaces 30c, 30d is elongated. Each surface of the inner pair of insert top wedge surfaces 30c, 30d is located between the outer pair of insert top wedge surfaces 30a, 30b and concavely converges toward the other surface of the pair.

In accordance with some embodiments, one of the surfaces of the inner pair of insert top wedge surfaces 30c, 30d may be located on one side of the longitudinal insert bisector plane P1 and the other surface of the inner pair of insert top wedge surfaces 30c, 30d may be located on the other side of the longitudinal insert bisector plane P1.

The inner pair of insert top wedge surfaces 30c, 30d is closer to the longitudinal insert bisector plane P1 than the outer pair of insert top wedge surfaces 30a, 30b. Specifically, each surface of the inner pair of insert top wedge surfaces 30c, 30d may be closer to the longitudinal insert bisector plane P1 than each surface of the outer pair of insert top wedge surfaces 30a, 30b.

In accordance with some embodiments, each surface of the inner pair of insert top wedge surfaces 30c, 30d may exhibit mirror symmetry with regards to the other surface. Specifically, the inner pair of insert top wedge surfaces 30c, 30d may exhibit mirror symmetry about the longitudinal insert bisector plane P1.

In accordance with some embodiments, each surface of the inner pair of insert top wedge surfaces 30c, 30d may be planar.

In accordance with some embodiments, first transition surfaces (not shown) may extend between each one of the outer pair of insert top wedge surfaces 30a, 30b and the adjacent surface of the inner pair of insert top wedge surfaces 30c, 30d. The first transition surfaces may be planar or curved.

Alternatively, each one of the inner pair of insert top wedge surfaces 30c, 30d may extend from the adjacent surface of the outer pair of insert top wedge surfaces 30a, 30b (i.e. intersect the outer pair).

An inner top angle It is defined between the inner pair of insert top wedge surfaces 30c, 30d. Specifically, the inner top angle It is defined in a plane perpendicular to the insert longitudinal axis A1 (indicated as line A-A in FIG. 6a). The outer and inner top angles Ot, It fulfill the condition: $Ot>It$. In accordance with some embodiments, the inner top angle It may fulfill the condition: $100°<It<130°$. Preferably, for cutting operations where lateral forces are greater, the inner top angle It may fulfill the condition: $115°<It<130°$. More preferably, the inner top angle It may be about $It=120°$. By "about" it is meant that the inner top angle It is within 2° of 120°.

Taking into account that $Ot>It$ and the broader ranges of $130°<Ot<160°$ and $100°<It<130°$, it is clear that $It<Ot<It+60°$. In other words, the angle formed by the outer pair of insert top wedge surfaces 30a, 30b exceeds the angle formed by the inner pair of insert top wedge surfaces 30c, 30d by less than 60°. Preferably, the inner and outer top angles It, Ot may fulfill the condition: $It<Ot<It+30°$. In a particularly preferred embodiment, the outer and inner top angles Ot, It may fulfill the condition that Ot is about $It+20°$. Again, by "about" it is meant that Ot is greater than It by between 18° and 22°. In some embodiments, the longitudinal insert bisector plane P1 may bisect the outer and inner top angles Ot, It.

In accordance with some embodiments, a second transition surface 31 (seen in FIG. 4b) may extend between the inner pair of insert top wedge surfaces 30c, 30d. The second transition surface 31 may be planar or curved. The longitudinal insert bisector plane P1 may intersect the second transition surface 31.

Alternatively, the inner pair of insert top wedge surfaces 30c, 30d may extend to one another (i.e. intersect one another). In specific embodiments, the inner pair of insert top wedge surfaces 30c, 30d may intersect one another at the longitudinal insert bisector plane P1.

The bottom insert surface 32 has an elongated bottom groove 34 which comprises two pairs of elongated wedge surfaces. These include an outer pair of insert bottom wedge surfaces 36a, 36b and an inner pair of insert bottom wedge surfaces 36c, 36d.

In the outer pair of insert bottom wedge surfaces 36a, 36b, each surface extends lengthwise in a direction between the front insert surface 20 and the rear insert surface 22 along one of the first and second insert side surfaces 40, 44. That is to say, each surface of the outer pair of insert bottom wedge surfaces 36a, 36b is elongated.

Each surface of the outer pair of insert bottom wedge surfaces 36a, 36b is located between the first and second insert side surfaces 40, 44 and concavely converges toward the other surface of the pair. One of the surfaces of the outer pair of insert bottom wedge surfaces 36a, 36b is located on one side of the longitudinal insert bisector plane P1 and the other surface of the outer pair of insert bottom wedge surfaces 36a, 36b is located on the other side of the longitudinal insert bisector plane P1.

In accordance with some embodiments, each surface of the outer pair of insert bottom wedge surfaces 36a, 36b may exhibit mirror symmetry with regards to the other surface. Specifically, the outer pair of insert bottom wedge surfaces 36a, 36b may exhibit mirror symmetry about the longitudinal insert bisector plane P1.

In accordance with some embodiments, each surface of the outer pair of insert bottom wedge surfaces 36a, 36b may be planar.

An outer bottom angle Ob is defined between the exterior of the outer pair of insert bottom wedge surfaces 36a, 36b. Specifically, the outer bottom angle Ob is defined in a plane perpendicular to the insert longitudinal axis A1 (indicated as line A-A in FIG. 6a). In accordance with some embodiments, the outer bottom angle Ob may fulfill the condition: 130°<Ob<160°. Preferably, the outer bottom angle Ob may fulfill the condition: 135°<Ob<150°. More preferably, the outer bottom angle Ob may be about Ob=140°. By "about" it is meant that the outer bottom angle Ob is within 2° of 140°.

In accordance with some embodiments, the outer top and bottom angles Ot, Ob may further fulfill the condition: Ot=Ob.

In the inner pair of insert bottom wedge surfaces 36c, 36d, each surface extends lengthwise in a direction between the front insert surface 20 and the rear insert surface 22 along one of the outer pair of insert bottom wedge surfaces 36a, 36b. That is to say, each surface of the inner pair of insert bottom wedge surfaces 36c, 36d is elongated. Each surface of the inner pair of insert bottom wedge surfaces 36c, 36d is located between the outer pair of insert bottom wedge surfaces 36a, 36b and concavely converges toward the other surface of the pair.

In accordance with some embodiments, one of the surfaces of the inner pair of insert bottom wedge surfaces 36c, 36d may be located on one side of the longitudinal insert bisector plane P1 and the other and the other surface of the inner pair of insert bottom wedge surfaces 36c, 36d may be located on the other side of the longitudinal insert bisector plane P1.

The inner pair of insert bottom wedge surfaces 36c, 36d is closer to the longitudinal insert bisector plane P1 than the outer pair of insert bottom wedge surfaces 36a, 36b. In some embodiments, each surface of the inner pair of insert bottom wedge surfaces 36c, 36d may be closer to the longitudinal insert bisector plane P1 than each surface of the outer pair of insert bottom wedge surfaces 36a, 36b.

In accordance with some embodiments, each surface of the inner pair of insert bottom wedge surfaces 36c, 36d may exhibit mirror symmetry with regards to the other surface. Specifically, the inner pair of insert bottom wedge surfaces 36c, 36d may exhibit mirror symmetry about the longitudinal insert bisector plane P1.

In accordance with some embodiments, each surface of the inner pair of insert bottom wedge surfaces 36c, 36d may be planar.

In accordance with some embodiments, third transition surfaces (not shown) may extend between each of the outer pair of insert bottom wedge surfaces 36a, 36b and the adjacent surface of the inner pair of insert bottom wedge surfaces 36c, 36d. The third transition surfaces may be planar or curved.

Alternatively, the inner pair of insert bottom wedge surfaces 36c, 36d may extend from the outer pair of insert bottom wedge surfaces 36a, 36b (i.e. intersect the outer pair).

An inner bottom angle Ib is defined between the inner pair of insert bottom wedge surfaces 36c, 36d. Specifically, the inner bottom angle Ib is defined in a plane perpendicular to the insert longitudinal axis A1 (indicated as line A-A in FIG. 6a). The outer and inner bottom angles Ob, Ib fulfill the condition: Ob>Ib. In accordance with some embodiments, the inner bottom angle Ib may fulfill the condition: 100°<Ib<130°. Preferably, the inner bottom angle Ib may fulfill the condition: 115°<Ib<130°. More preferably, the inner bottom angle Ib may be about Ib=120°. By "about" it is meant that the inner bottom angle Ib is within 2° of 120°.

Taking into account that Ob>Ib and the broader ranges of 130°<Ob<160° and 100°<Ib<130°, it is clear that Ib<Ob<Ib+60°. In other words, the angle formed by the outer pair of insert bottom wedge surfaces 36a, 36b exceeds the angle formed by the inner pair of insert bottom wedge surfaces 36c, 36d by less than 60°. Preferably, the inner and outer bottom angles Ib, Ob may fulfill the condition: Ib<Ob<Ib+30°. In a particularly preferred embodiment, the outer and inner bottom angles Ob, Ib may fulfill the condition that Ob is about Ib+20°. Again, by "about" it is meant that Ob is greater than Ib by between 18° and 22°. In some embodiments, the longitudinal insert bisector plane P1 bisects the outer and inner bottom angles Ob, Ib.

In accordance with some embodiments, the inner top and bottom angles It, Ib may further fulfill the condition: It=Ib.

In accordance with some embodiments, all the following embodiments may be fulfilled: 130°<Ot, Ob<160°. 100°<It, Ib<130°. It<Ot<It+30° and Ib<Ob<Ib+30°. In some embodiments, also Ot=Ob and It=Ib.

In accordance with some embodiments, a fourth transition surface 37 (seen in FIG. 4c) may extend between the inner pair of insert bottom wedge surfaces 36c, 36d. The fourth transition surface 37 may be planar or curved. The longitudinal insert bisector plane P1 may intersect the fourth transition surface 37.

Alternatively, the inner pair of insert bottom wedge surfaces 36c, 36d may extend to one another (i.e. intersect one another). In specific embodiments, the inner pair of insert bottom wedge surfaces may intersect one another at the longitudinal insert bisector plane P1.

Each of the outer top and bottom angles Ot, Ob, as well as the inner top and bottom angles It, Ib, may be more specifically defined, in a front view of the cutting insert 10, 10' as seen in FIG. 6c, as the exterior angle of intersection between extensions of the pairs of surfaces 30a, 30b, 30c, 30d, 36a, 36b, 36c, 36d defining the angles Ot, Ob, It, Ib.

The cutting insert 10, 10' further includes a first cutting edge 50, formed at an intersection between the front insert surface 20 and the top insert surface 26. In accordance with some embodiments, a first rake surface 52 may extend from the first cutting edge 50 on the top insert surface 26. A first relief surface 54 may extend from the first cutting edge 50 on the front insert surface 20. During turning cutting operations, relative to the workpiece being machined, the cutting insert 10, 10' is fed in a direction along the insert vertical axis A3.

The cutting insert 10, 10' may have a second cutting edge 60 formed at the intersection of the rear insert surface rear 22 and either the top insert surface 26 (as seen in FIG. 3) or the bottom insert surface 32 (as seen in FIGS. 4a to 4e). In either case, the cutting insert is considered to be "double-ended" and may have 180° rotational symmetry about either its insert vertical axis A3 (as seen in FIG. 3) or about its insert lateral axis A2 (as seen in FIGS. 4a to 4e).

Figures 7A, 7B:
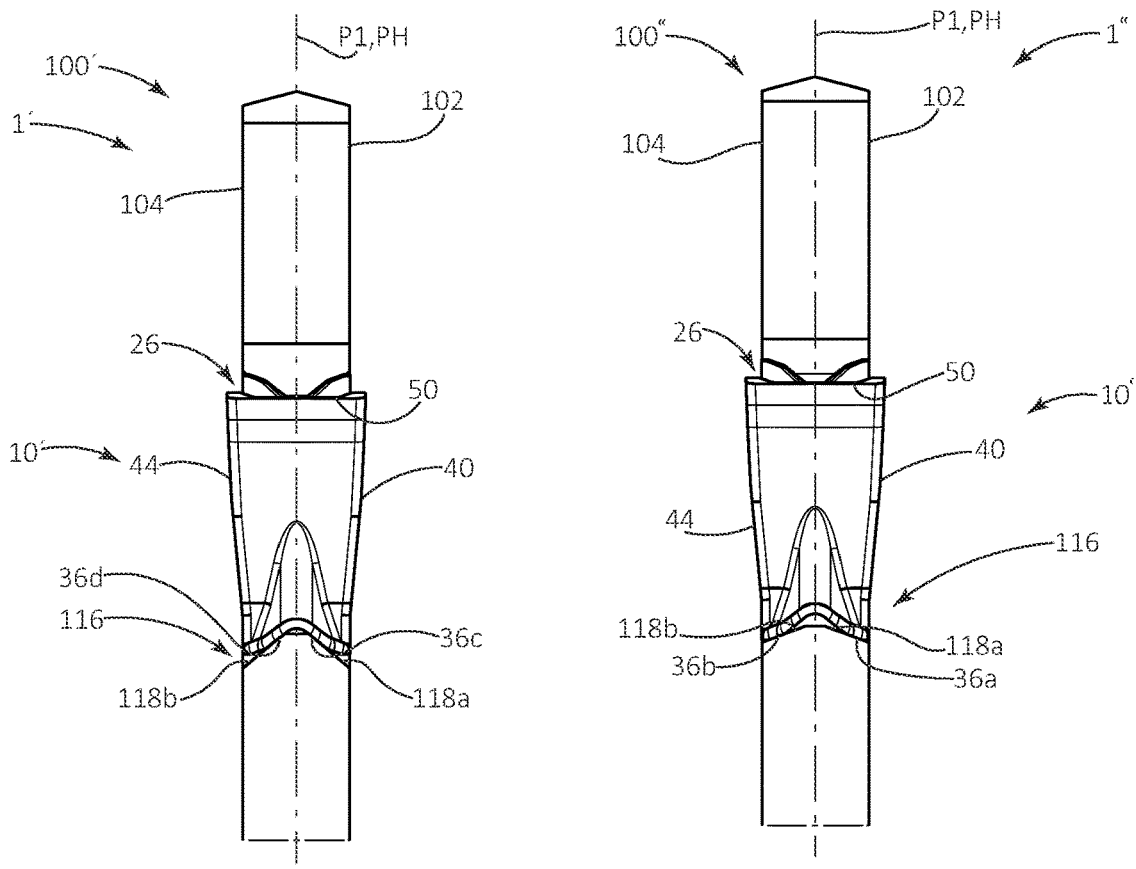

Drawing attention to FIG. 7b, another cutting tool 1" in accordance with the present invention is shown. The cutting tool 1" has a different tool holder 100" and the same cutting insert 10' as the cutting insert seen in FIG. 3.

As shown in FIGS. 5a to 7b, the tool holder 100, 100', 100" includes a pair of opposing first and second holder side surfaces 102, 104, with a holder front surface 106 extending therebetween. The tool holder 100, 100', 100" further includes an insert pocket 110, made for securing the cutting insert 10, 10' in the tool holder 100, 100', 100". In some embodiments, the tool holder 100, 100', 100" further includes opposing top and bottom holder surfaces 108, 109 connecting the first and second holder side surfaces 102, 104.

The insert pocket 110 opens out to the first holder side surface 102, the second holder side surface 104 and the holder front surface 106. The insert pocket 110 includes a pocket top surface 112 and an opposing pocket bottom surface 116, with a pocket rear surface 120 located therebetween.

The insert pocket 110 has a longitudinally extending pocket axis L which passes midway between the opposing pocket top surface 112 and pocket bottom surface 116. In some embodiments, the longitudinally extending pocket axis L may intersect the pocket rear surface 120. The insert pocket 110 further has a longitudinal pocket bisector plane PH which contains the longitudinally extending pocket axis L and passes through the pocket rear surface 120, the pocket top surface 112 and the pocket bottom surface 116. In some embodiments, in the assembled tool, the longitudinally extending pocket axis L may be coincident with the insert longitudinal axis A1 and the longitudinal pocket bisector plane PH may be coplanar with the longitudinal insert bisector plane P1.

The pocket top surface 112 includes an elongated pair of pocket top wedge surfaces 114a, 114b, convexly converging from the first and second holder side surfaces 102, 104. A top pocket angle Pt is defined between the interior of the pair of pocket top wedge surfaces 114a, 114b. Specifically, the top pocket angle Pt is defined in a plane perpendicular to the pocket axis L (indicated as line A-A in FIG. 6a). In accordance with some embodiments, the top pocket angle Pt may fulfill the condition: $100°<Pt<160°$.

The pocket bottom surface 116 includes an elongated pair of pocket bottom wedge surfaces 118a, 118b, convexly converging from the first and second holder side surfaces 102, 104. A bottom pocket angle Pb is defined between the interior of the pair of pocket bottom wedge surfaces 118a, 118b. Specifically, the bottom pocket angle Pb is defined in a plane perpendicular to the pocket axis L (indicated as line A-A in FIG. 6a). In accordance with some embodiments, the bottom pocket angle Pb may fulfill the condition: $100°<Pb<160°$.

In accordance with some embodiments, the top and bottom pocket angles Pt, Pb may fulfill the conditions Pt≤Ot and Pb≤Ob. Preferably, the top and bottom pocket angles Pt, Pb may fulfill the condition Pt=Pb.

Depending on the cutting operation, each of the top and bottom pocket angles Pt, Pb may further fulfill the conditions Pt≤It and Pb≤Ib. Generally speaking, this condition is preferred in cutting operations with strong lateral forces. Alternatively, in accordance with some embodiments, each of the top and bottom pocket angles Pt, Pb may further fulfill the conditions It≤Pt≤Ot and Ib≤Pb≤Ob. Generally speaking, this condition is preferred in cutting operations with both weaker lateral forces and stronger loads on the cutting insert. Advantageously, the aforementioned cutting insert may be retained in two different tool holders having different pocket angles from one another. For example, as shown in FIGS. 7a and 7b, the cutting insert 10' may be retained in two different tool holders 100', 100", with different pairs of the outer and inner pairs of insert top wedge surfaces 30a, 30b, 30c, 30d and outer and inner pairs of insert bottom wedge surfaces 36a, 36b, 36c, 36d abutting the pairs of pocket top and bottom wedge surfaces 114a, 114b, 118a, 118b in the different tool holders 100', 100".

When the cutting tool 1, 1', 1" is assembled, only one pair of the outer and inner pair of insert top wedge surfaces 30a, 30b, 30c, 30d abuts the pair of pocket top wedge surfaces 114a, 114b. Further, when the cutting tool 1, 1', 1" is assembled only one pair of the outer and inner pairs of insert bottom wedge surfaces 36a, 36b, 36c, 36d abuts the pair of pocket bottom wedge surfaces 118a, 118b.

Thus, on the top insert surface 26, either both surfaces of the inner pair of insert top wedge surfaces 30c, 30d or both surfaces of the outer pair of insert top wedge surfaces 30a, 30b abut the pair of pocket top wedge surfaces 114a, 114b. Likewise, on the bottom insert surface 32, either both surfaces of the inner pair of insert bottom wedge surfaces 36c, 36d or both surfaces of the outer pair of insert bottom wedge surfaces 36a, 36b abut the pair of pocket bottom wedge surfaces 118a, 118b.

Preferably, neither wedge surface belonging to the other of the outer and inner pairs of insert top and bottom wedge surfaces 30a, 30b, 30c, 30d, 36a, 36b, 36c, 36d abuts the corresponding surface of the pair of pocket top and bottom wedge surface 114a, 114b, 118a, 118b. In other words, in the assembled tool 1, 1', 1", on each of the top and bottom insert surfaces 26, 32, insert wedge surfaces belonging to different pairs of the inner and outer pairs do not simultaneously abut the corresponding pocket wedge surfaces.

Moreover, as seen in FIG. 6c, in a cross-sectional view of the cutting tool 1, 1', 1" taken in a plane passing through the top and bottom insert surfaces 26, 32, and generally parallel to the front insert surface 20, at both the top and bottom insert surfaces 26, 32, there are only two regions of contact between the cutting insert 10, 10' and the insert pocket 110. This contrasts with the arrangement seen in FIG. 5 of aforementioned U.S. Pat. No. 6,086,291, showing three regions of contact between the bottom surface of the insert and the bottom surface of the pocket.

In some embodiments, for example as shown in FIG. 7b, the outer pair of insert bottom wedge surfaces 36a, 36b may abut the pair of pocket bottom wedge surfaces 118a, 118b. In this case, the inner pair of insert bottom wedge surfaces 36c, 36d are spaced apart from the pair of pocket bottom wedge surfaces 118a, 118b (i.e. not abutting).

It is then preferable that the outer pair of insert top wedge surfaces 30a, 30b abuts the pair of pocket top wedge surfaces 114a, 114b. In this case the inner pair of insert top wedge surfaces 30c, 30d are spaced apart from the pair of pocket top wedge surfaces 114a, 114b (i.e. not abutting).

In said embodiments, so as to be complementary to the outer top and bottom angles Ot, Ob, the top and bottom pocket angles Pt, Pb of the tool holder 100" may fulfill the condition $130°<Pt, Pb<160°$. Preferably, the top and bottom pocket angles Pt, Pb may fulfil the condition $135°<Pt, Pb<150°$. More preferably, the top and bottom pocket angles Pt, Pb may be about Pt=140° and Pb=140°. By "about" it is meant that the top and bottom pocket angles Pt, Pb are within 2° of 140°.

In said embodiments, it is also preferable that the outer top and bottom angles Ot, Ob fulfil the condition Ot=Pt and Ob=Pb.

In other embodiments of the present invention, for example as shown in FIG. 7a, the inner pair of insert bottom wedge surfaces 36c, 36d may abut the pair of pocket bottom wedge surfaces 118a, 118b. In this case the outer pair of insert bottom wedge surfaces 36a, 36b are spaced apart from the pair of pocket bottom wedge surfaces 118a, 118b (i.e. not abutting).

It is then preferable that the inner pair of insert top wedge surfaces 30c, 30d abuts the pair of pocket top wedge surfaces 114a, 114b. In this case the outer pair of insert top wedge surfaces 30a, 30b are spaced apart from the pair of pocket top wedge surfaces 114a, 114b (i.e. not abutting).

In said embodiments, so as to be complementary to the inner top and bottom angles It, Ib, the top and bottom pocket angles Pt, Pb of the tool holder 100, 100' may fulfill the condition 100°<Pt, Pb<130°. Preferably, the top and bottom pocket angles Pt, Pb may further fulfil the condition 115° <Pt, Pb<130°. More preferably, the top and bottom pocket angles Pt, Pb may be about Pt=120° and Pb=120°. By "about" it is meant that the top and bottom pocket angles Pt, Pb are within 2° of 120°.

In said embodiments, it is also preferable that the inner top and bottom angles It, Ib fulfil the condition It=Pt and Ib=Pb.

Although the subject matter of the present application has been described to a certain degree of particularity, it should be understood that various alterations and modifications could be made without departing from the spirit or scope of the invention as hereinafter claimed.

What is claimed is:

1. A cutting insert (10, 10') having an insert longitudinal axis (A1), and comprising:
   a front insert surface (20) and an opposing rear insert surface (22);
   a peripheral insert surface (24) extending between the front insert surface (20) and the rear insert surface (22) and about the insert longitudinal axis (A1), the peripheral insert surface (24) comprising:
      a top insert surface (26) and an opposing bottom insert surface (32);
      a first insert side surface (40) connecting the top and bottom insert surfaces (26, 32); and
      a second insert side surface (44) opposing the first insert side surface (40) and connecting the top and bottom insert surfaces (26, 32);
   a longitudinal insert bisector plane (P1) which contains the insert longitudinal axis (A1) and passes midway between the first and second insert side surfaces (40, 44);
   an insert lateral axis (A2) passing midway in-between the top and bottom insert surfaces (26, 32), midway in-between the front and rear insert surfaces (20, 22) and through the first and second insert side surfaces (40, 44);
   an insert vertical axis (A3) contained in the longitudinal insert bisector plane (P1), passing midway in-between the first and second insert side surfaces (40, 44) and through the top and bottom insert surfaces (26, 32); and
   a first cutting edge (50) formed an intersection between the front insert surface (20) and the top insert surface (26);

wherein:
   the top insert surface (26) has an elongated top groove (28) which comprises:
      an elongated outer pair of insert top wedge surfaces (30a, 30b) concavely converging in a direction from the first and second insert side surfaces (40, 44) towards each other, and defining an outer top angle Ot; and
      an elongated inner pair of insert top wedge surfaces (30c, 30d) located between the outer pair of insert top wedge surfaces (30a, 30b), concavely converging in a direction from the outer pair of insert top wedge surfaces (30a, 30b), and defining an inner top angle It;
   the bottom insert surface (32) has an elongated bottom groove (34) which comprises:
      an elongated outer pair of insert bottom wedge surfaces (36a, 36b) concavely converging in a direction from the first and second insert side surfaces (40, 44) and defining an outer bottom angle Ob; and
      an elongated inner pair of insert bottom wedge surfaces (36c, 36d) located between the outer pair of insert bottom wedge surfaces (36a, 36b), concavely converging in a direction from the outer pair of insert bottom wedge surfaces (36a, 36b), and defining an inner bottom angle Ib;
   the outer and inner top angles Ot, It fulfill the condition: 160°>Ot>It>100°; and
   the outer and inner bottom angles Ob, Ib fulfill the condition: 160°>Ob>Ib>100°.

2. The cutting insert (10, 10') according to claim 1, wherein:
   each surface of the outer and inner pairs of insert top wedge surfaces (30a, 30b, 30c, 30d) is planar; and
   each surface of the outer and inner pairs of insert bottom wedge surfaces (36a, 36b, 36c, 36d) is planar.

3. The cutting insert (10, 10') according to claim 1, wherein:
   the outer top and bottom angles Ot, Ob fulfill the condition: Ot=Ob; and
   the inner top and bottom angles It, Ib fulfill the condition: It=Ib.

4. The cutting insert (10, 10') according to claim 1, wherein:
   the outer top and bottom angles Ot, Ob fulfill the condition: 130°<Ot, Ob<160°; and
   the inner top and bottom angles It, Ib fulfill the condition: 100°<It, Ib<130°.

5. The cutting insert (10') according to claim 1, wherein:
   the outer and inner top angles Ot, It fulfill the condition: It<Ot<It+30°; and
   the outer and inner bottom angles Ob, Ib fulfill the condition: Ib<Ob<Ib+30°.

6. The cutting insert (10, 10') according to claim 1, wherein the cutting insert (10, 10') is double-ended and further comprises a second cutting edge (60) formed at an intersection between the rear insert surface (22) and either the top insert surface (26) or the bottom insert surface (32).

7. The cutting insert (10') according to claim 6, wherein:
   the second cutting edge (60) is formed at an intersection between the rear insert surface (22) and the top insert surface (26); and
   the cutting insert has 180° rotational symmetry about the insert vertical axis (A3).

8. The cutting insert (10) according to claim 6, wherein:
   the second cutting edge (60) is formed at an intersection between the rear insert surface (22) and the bottom insert surface (32); and
   the cutting insert has 180° rotational symmetry about the insert lateral axis (A2).

9. A cutting tool (1, 1', 1") comprising:
a cutting insert (10, 10') according to claim 1; and
a tool holder (100, 100', 100") comprising:
  a pair of opposing first and second holder side surfaces (102, 104), with a holder front surface (106) extending therebetween;
  an insert pocket (110) opening out to the first holder side surface (102), the second holder side surface (104) and the holder front surface (106), the insert pocket (110) having a longitudinally extending pocket axis (L) which passes midway between the opposing pocket top surface (112) and the pocket bottom surface (116);
  wherein:
  the cutting insert (10, 10') is releasably retained in the insert pocket (110).

10. The cutting tool (1, 1', 1") according to claim 9, wherein:
the insert pocket (110) comprises:
  a pocket top surface (112) and an opposing pocket bottom surface (116), with a pocket rear surface (120) located therebetween;
  the pocket top surface (112) comprising an elongated pair of pocket top wedge surfaces (114a, 114b), convexly converging from the first and second holder side surfaces (102, 104) with a top pocket angle Pt defined between the pair of pocket top wedge surfaces (114a, 114b); and
  the pocket bottom surface (116) comprising an elongated pair of pocket bottom wedge surfaces (118a, 118b), convexly converging from the first and second holder side surfaces (102, 104), with a bottom pocket angle Pb defined between the pair of pocket bottom wedge surfaces (118a, 118b);
and
  the cutting insert (10, 10') is retained in the insert pocket (110) with either:
    the pair of pocket top wedge surfaces (114a, 114b) abutting the outer pair of insert top wedge surfaces (30a, 30b) and the pair of pocket bottom wedge surfaces (118a, 118b) abutting the outer pair of insert bottom wedge surfaces (36a, 36b), or
    the pair of pocket top wedge surfaces (114a, 114b) abutting the inner pair of insert top wedge surfaces (30c, 30d) and the pair of pocket bottom wedge surfaces (118a, 118b) abutting the inner pair of insert bottom wedge surfaces (36c, 36d),
    such that in a cross-section of the cutting tool (1, 1', 1") taken in a plane passing through the top and bottom insert surfaces (26, 32) and generally parallel to the front insert surface (20), at both the top and bottom insert surfaces (26, 32), there are only two regions of contact between the cutting insert (10, 10') and the insert pocket (110), respectively.

11. The cutting tool (1, 1', 1") according to claim 10, wherein:
the top and bottom pocket angles Pt, Pb fulfill the condition: 100°<Pt, Pb<160°.

12. The cutting tool (1, 1', 1") according to claim 11 wherein:
the top pocket angle Pt fulfills the condition Pt≤Ot; and
the bottom pocket angle Pb fulfills the condition Pb≤Ob.

13. The cutting tool (1, 1') according to claim 11, wherein:
the top pocket angle Pt further fulfills the condition Pt≤It; and
the bottom pocket angle Pb further fulfills the condition Pb≤Ib.

14. The cutting tool (1") according to claim 12, wherein:
the top and bottom pocket angles Pt, Pb fulfill the condition: 130°<Pt, Pb<160°;
the outer pair of insert top wedge surfaces (30a, 30b) abuts the pair of pocket top wedge surfaces (114a, 114b); and
the outer pair of insert bottom wedge surfaces (36a, 36b) abuts the pair of pocket bottom wedge surfaces (118a, 118b).

15. The cutting tool (1, 1') according to claim 12, wherein:
the top and bottom pocket angles Pt, Pb fulfill the condition: 100°<Pt, Pb<130°;
the inner pair of insert top wedge surfaces (30c, 30d) abuts the pair of pocket top wedge surfaces (114a, 114b); and
the inner pair of insert bottom wedge surfaces (36c, 36d) abuts the pair of pocket bottom wedge surfaces (118a, 118b).

16. A cutting tool (1, 1', 1") comprising:
a cutting insert (10, 10') having an insert longitudinal axis (A1), and comprising:
  a front insert surface (20) and an opposing rear insert surface (22);
  a peripheral insert surface (24) extending between the front insert surface (20) and the rear insert surface (22) and about the insert longitudinal axis (A1), the peripheral insert surface (24) comprising:
    a top insert surface (26) and an opposing bottom insert surface (32);
    a first insert side surface (40) connecting the top and bottom insert surfaces (26, 32); and
    a second insert side surface (44) opposing the first insert side surface (40) and connecting the top and bottom insert surfaces (26, 32);
  a first cutting edge (50) formed an intersection between the front insert surface (20) and the top insert surface (26);
  the top insert surface (26) having an elongated top groove (28) which comprises:
    an elongated outer pair of insert top wedge surfaces (30a, 30b), concavely converging in a direction from the first and second insert side surfaces (40, 44) towards each other, with an outer top angle Ot defined between the outer pair of insert top wedge surfaces (30a, 30b); and
    an elongated inner pair of insert top wedge surfaces (30c, 30d), located between the outer pair of insert top wedge surfaces (30a, 30b) and concavely converging in a direction from the outer pair of insert top wedge surfaces (30a, 30b), with an inner top angle It defined between the inner pair of insert top wedge surfaces (30c, 30d);
  the bottom insert surface (32) having an elongated bottom groove (34) which comprises:
    an elongated outer pair of insert bottom wedge surfaces (36a, 36b), concavely converging in a direction from the first and second insert side surfaces (40, 44), with an outer bottom angle Ob defined between the outer pair of insert bottom wedge surfaces (36a, 36b); and
    an elongated inner pair of insert bottom wedge surfaces (36c, 36d), located between the outer pair of insert bottom wedge surfaces (36a, 36b) and concavely converging in a direction from the outer pair of insert bottom wedge surfaces (36a, 36b), with an inner bottom angle Ib defined between the inner pair of insert bottom wedge surfaces (36c, 36d);

and a tool holder (100, 100', 100") comprising:
  a pair of opposing first and second holder side surfaces (102, 104), with a holder front surface (106) extending therebetween;
  an insert pocket (110) accommodating the cutting insert (10) and opening out to the first holder side surface (102), the second holder side surface (104) and the holder front surface (106), the insert pocket (110) comprising:
    a pocket top surface (112) and an opposing pocket bottom surface (116), with a pocket rear surface (120) located therebetween;
    the pocket top surface (112) comprising an elongated pair of pocket top wedge surfaces (114a, 114b), convexly converging from the first and second holder side surfaces (102, 104) with a top pocket angle Pt defined between the pair of pocket top wedge surfaces (114a, 114b); and
    the pocket bottom surface (116) comprising an elongated pair of pocket bottom wedge surfaces (118a, 118b), convexly converging from the first and second holder side surfaces (102, 104), with a bottom pocket angle Pb defined between the pair of pocket bottom wedge surfaces (118a, 118b);

wherein:
the cutting insert (10, 10') is releasably retained in the tool holder (100, 100', 100");
one pair of the outer and inner pairs of insert top wedge surfaces (30a, 30b, 30c, 30d) abuts the pair of pocket top wedge surfaces (114a, 114b); and
one pair of the outer and inner pairs of insert bottom wedge surfaces (36a, 36b, 36c, 36d) abuts the pair of pocket bottom wedge surfaces (118a, 118b),
such that, in a cross-section of the cutting tool (1, 1', 1") taken in a plane passing through the top and bottom insert surfaces (26, 32) and generally parallel to the front insert surface (20), at both the top and bottom insert surfaces (26, 32), there are only two regions of contact between the cutting insert (10, 10') and the insert pocket (110).

17. The cutting tool (1, 1', 1") according to claim 16, wherein:
each surface of the outer and inner pairs of insert top wedge surfaces (30a, 30b, 30c, 30d) is planar; and
each surface of the outer and inner pairs of insert bottom wedge surfaces (36a, 36b, 36c, 36d) is planar.

18. The cutting tool (1, 1', 1") according to claim 16, wherein:
the outer and inner top angles Ot, It fulfill the condition: Ot>It; and
the outer and inner bottom angles Ob, Ib fulfill the condition: Ob>Ib.

19. The cutting tool (1, 1', 1") according to claim 18, wherein:
the outer top and bottom angles Ot, Ob fulfill the condition: Ot=Ob; and
the inner top and bottom angles It, Ib fulfill the condition: It=Ib.

20. The cutting tool (1, 1', 1") according to claim 18, wherein:
the outer top and bottom angles Ot, Ob fulfill the condition: 130°<Ot, Ob<160°; and
the inner top and bottom angles It, Ib fulfill the condition: 100°<It, Ib<130°.

21. The cutting tool (1, 1', 1") according to claim 20, wherein:
the top and bottom pocket angles Pt, Pb fulfill the condition: 100°<Pt, Pb<160°.

22. The cutting tool (1, 1', 1") according to claim 21, wherein:
the top pocket angle Pt fulfills the condition Pt≤Ot; and
the bottom pocket angle Pb fulfills the condition Pb≤Ob.

23. The cutting tool (1") according to claim 22, wherein:
the top and bottom pocket angles Pt, Pb fulfill the condition: 130°<Pt, Pb<160°;
the outer pair of insert top wedge surfaces (30a, 30b) abuts the pair of pocket top wedge surfaces (114a, 114b); and
the outer pair of insert bottom wedge surfaces (36a, 36b) abuts the pair of pocket bottom wedge surfaces (118a, 118b).

24. The cutting tool (1, 1') according to claim 22, wherein:
the top pocket angle Pt further fulfills the condition Pt≤It; and
the bottom pocket angle Pb further fulfills the condition Pb≤Ib.

25. The cutting tool (1, 1') according to claim 24, wherein:
the top and bottom pocket angles Pt, Pb fulfill the condition: 100°<Pt, Pb<130°;
the inner pair of insert top wedge surfaces (30c, 30d) abuts the pair of pocket top wedge surfaces (114a, 114b); and
the inner pair of insert bottom wedge surfaces (36c, 36d) abuts the pair of pocket bottom wedge surfaces (118a, 118b).

* * * * *